Figure 1:
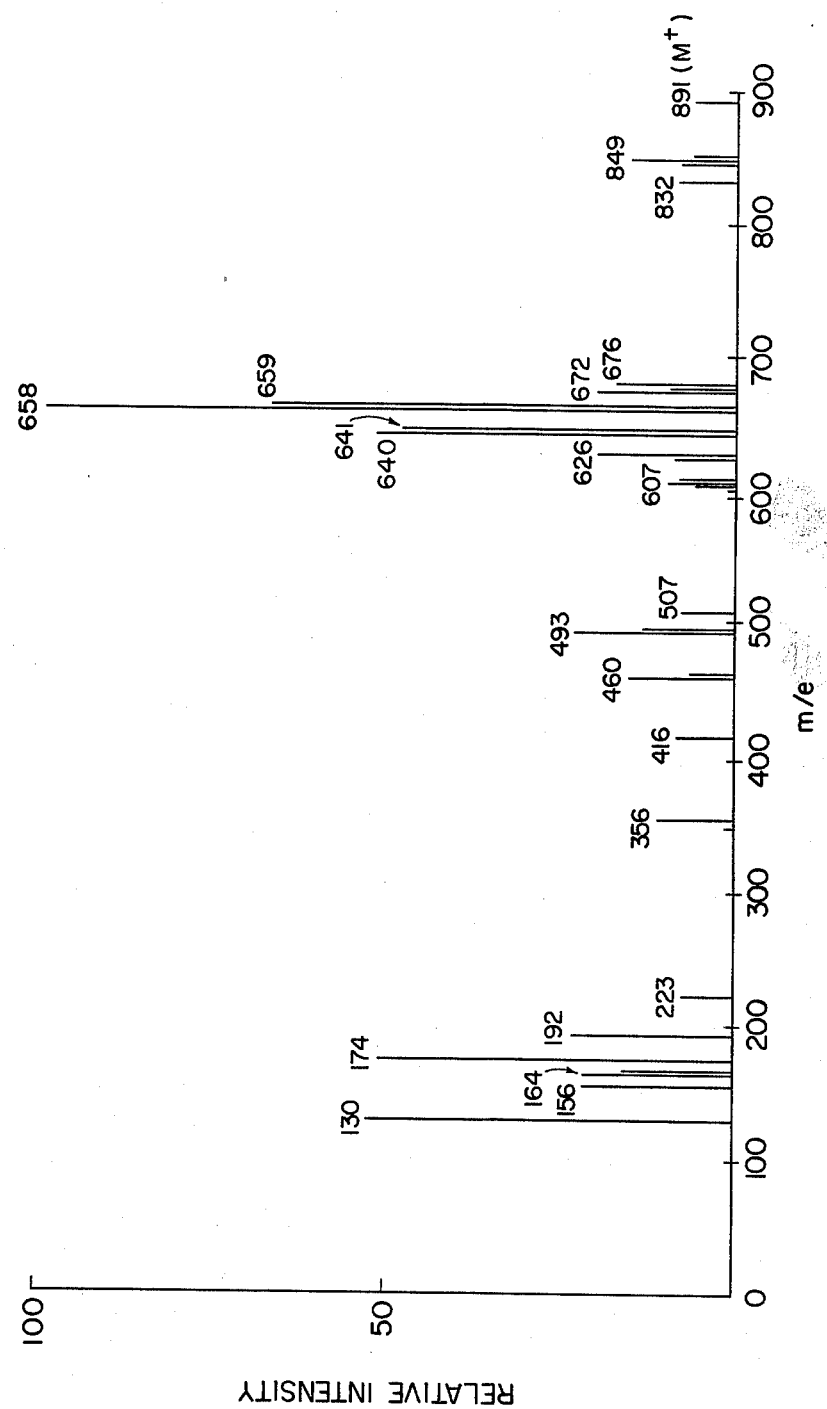

United States Patent [19]

Westley

[11] 4,076,802
[45] Feb. 28, 1978

[54] ANTIBIOTIC X-4357B

[75] Inventor: John Westley, Cedar Grove, N.J.

[73] Assignee: Hoffmann-La Roche Inc., Nutley, N.J.

[21] Appl. No.: 782,680

[22] Filed: Mar. 30, 1977

[51] Int. Cl.$^2$ .............................................. A61K 35/74
[52] U.S. Cl. ................................... 424/122; 195/80 R
[58] Field of Search ....................... 424/122; 195/80 R

[56] References Cited
U.S. PATENT DOCUMENTS

| 3,923,981 | 12/1975 | Vos et al. | 424/122 |
| 4,016,257 | 4/1977 | Connor et al. | 424/122 |

Primary Examiner—Jerome D. Goldberg
Attorney, Agent, or Firm—Samuel L. Welt; George M. Gould; Frank P. Hoffman

[57] ABSTRACT

A new antibiotic substance X-4357B is obtained by culturing a strain of Streptomyces and recovering said substance from the fermentation mixture. The new substance possesses fungicidal, larvicidal and cytotoxic activities.

2 Claims, 3 Drawing Figures

ANTIBIOTIC X-4357B

BACKGROUND OF THE INVENTION

There is provided, according to the present invention, an antibiotic substance having principal activities as a fungicide, larvicide and a cytotoxic agent.

There is further provided according to the present invention a process for the production of such an antibiotic substance which comprises cultivation of a strain of Streptomyces X-4357 in an aqueous nutrient under submerged aerobic conditions and thereafter isolating and recovering the compound from said solution.

The organism producing the antibiotic of the present invention is a new species designated Streptomyces X-4357. A culture of the living organism, given the laboratory designation X-4357, has been deposited in the U.S. Department of Agriculture, Agricultural Reserch Service, NRRL, Peoria, Ill., and added to its permanent collection of microorganisms as NRRL 11082.

The representative strain of Streptomyces X-4357 has the following characteristics:

Using the criteria of the International Streptomyces Project (ISP) (Shirling and Gottlieb,1966) and the Key of Nonomura (1974)(Tables II, III and IV), the culture appears closest to but not identical with *Streptomyces regensis* (Shirling and Gottlieb (1972), the spores of the present culture being more developed and the color of the colony surface darker.

Table 1

Physiological Reactions of Streptomyces X-4357*

1-6 * Gordon, R. E., "The Taxonomy of Soil Bacteria" in Ecology of Soil Bacteria, T. R. G. Gray and D. Parkinson, Eds., Liverpool University Press, Liverpool, England, 1967.

| | |
|---|---|
| Hydrolysis of: | |
| Adenine | + |
| Casein | + |
| Hypoxanthine | + |
| Tyrosine | + |
| Potato starch | + |
| Production of: | |
| Urease | − |
| Nitrate reductase | +(w) |
| Utilization of: | |
| Citrate | + |
| Lactate | + |
| Malate | + |
| Mucate | − |
| Oxalate | − |
| Succinate | + |
| Acid from: | |
| Adonitol | − |
| Arabinose | + |
| Dulcitol | + |
| Erythritol | − |
| Galactose | + |
| Glucose | + |
| Inositol | + |
| Lactose | + |
| Maltose | + |
| Mannitol | + |
| Mannose | + |
| Melibiose | + |
| α-Me-D-Glucoside | + |
| Raffinose | + |
| Rhamnose | + |
| Sorbitol | − |
| Trehalose | + |
| Xylose | + |
| Growth at/in: | |
| 10° | − |
| 45° | − |
| 53° | − |
| Lysozyme broth | − |
| Salicylate broth | − |
| Glycerol broth | + |
| Isomer of DAP | L | w = weak

Table 2

Melanoid Pigment Production and Carbohydrate Utilization of Streptomyces X-4357 (ISP System)*

1-6 * Shirling, E. B. and D. Gottlieb, Methods for Characterization of Streptomyces species, Intern. J. System. Bacteriol., 16: 313–340, 1966.

| | |
|---|---|
| Basal Control Medium | ± |
| Arabinose | 2.5+ |
| Cellulose | ± |
| Fructose | 3+ |
| Glucose | 3+ |
| Inositol | 3+ |
| Mannitol | 2+ |
| Raffinose | 3+ |
| Rhamnose | 3+ |
| Sucrose | 3+ |
| Xylose | 3+ |

Melanoid Pigment Production (Tryptose-Yeast Medium)-+

Table 3

Spore Morphology of Streptomyces X-4357 (ISP System)*

1-6 * Shirling, E. B. and D. Gottlieb, Methods for Characterization of Streptomyces species, Intern, J. System. Bacteriol., 16: 313–340, 1966.

| Spore chain morphology | Average Number of Spores in Chain | Spore Surface |
|---|---|---|
| Section: Spirales | 20–40 | Smooth |

Table 4

Colony Morphology of Streptomyces X-4357 (ISP System)[1]

Table 4

| Colony Morphology of Streptomyces X-4357 (ISP System)[1] | | | |
|---|---|---|---|
| | Color colony surface[2] | Color colony reverse[3] | Soluble pigment |
| Series: Gray | | | |
| Yeast Malt (ISP #2) | Little aerial mycelium | Cg7S[5] (Dark olive-green) | Yellow-brown[4] |
| Oatmeal (ISP#3) | 5fe →g (Spotty) (Light grayish reddish brown to medium gray) | C6b (Light gray-beige) | Light greenish yellow-brown[4] |
| Inorganic-salts Starch (ISP #4) | 2dc (Yellowish-gray and 5fe →g | Cg7s | Light greenish yellow-brown[4] |
| Glucose Aspargine | 5fe →g | C7a | None |

[1]As in Table 2
[2]Tresner-Backus Color Guide
[3]Prauser's Color Guide (1964)
[4]No change in 0.05 N HCl or NaOH
[5]Read at 14 d.; at 3 d. bright green The Streptomyces species X-4357 described herein includes all strains of Streptomyces which form a compound as claimed in the present application and which cannot be definitely differentiated from the strain NRRL 11082 and its subcultures including mutants and variants. The claimed compound is described herein and after this identification is known, it is easy to differentiate the strains producing this compound from others.

Streptomyces X-4357 when grown under suitable conditions produces antibiotic X-4357B. A fermentation broth containing Streptomyces X-4357 is prepared by inoculating spores or mycelia of the antibiotic producing organism into a suitable medium and then cultivating under aerobic conditions. For the production of antibiotic X-4357B, cultivation on a solid medium or on a stationary liquid medium is possible but for production in large quantities, cultivation in an aerated submerged growth, i.e., in a liquid medium, is preferred. The temperature of the cultivation may be varied over a wide range, i.e., 20° C. to 35° C., within which the organism may grow but a temperature range of 25° C. to 32° C. and a substantially neutral pH is preferred. In the submerged aerobic fermentation of the organism for the production of the compound X-4357B, the medium may contain as the source for carbon a commercially available glyceride oil or a carbohydrate such as glycerol, glucose, maltose, lactose, dextrin, starch, etc., in pure or crude states and as the source of nitrogen an organic material such as soybean meal, distillers solubles, peanut meal, cotton seed meal, meat extract, peptone, fish meal, yeast extract, corn steep liquor, etc. and when desired, inorganic sources of nitrogen such as nitrates and ammonium salts and mineral salts such as ammonium sulfate, magnesium sulfate and the like. It also may contain sodium chloride, potassium chloride, potassium phosphate and the like and buffering agents such as sodium citrate, calcium carbonate or phosphates and trace amounts of heavy metal salts. In aerated submerged culturing procedures, an anti-foam agent such as liquid paraffin, fatty oils or silicone compounds may be utilized. It should be noted that more than one kind of carbon source, nitrogen source or anti-foam source may be used for the production of antibiotic X-4357B.

The compound has the following solubilities in mg/ml: in benzyl alcohol, >100; 95% ethanol, 47.5; propylene glycol, <1; glycerine, <1; polyethylene glycol 400, <1; dimethylformamide, >100; tetrahydrofuran, >100; acetone, >100; methanol, >100; and water; <1.

The compound has a 24 hour acute toxicity ($LD_{50}$) in mice of 21 mg/kg (p.o.) and 2.45 mg/kg (i.p.).

The compound X-4357B has a molecular formula of $C_{47}H_{77}NO_{15}$ and a molecular weight of 891. The compound exhibits antifungal activity against *Candida albicans*, *Penicillium digitatum*, *Saccharomyces cerevisiae* and *Paecilomyces varioti* as shown in Table 5 below.

Table 5

Minimum Inhibitory Concentrations (MIC) Values Against Two Yeasts, a Mold and a Fungus

| Culture Number | Two Yeasts, a Mold and a Fungus Organism | MIC value (μg/ml) |
| --- | --- | --- |
| NRRL 477 | *Candida albicans* 155 (yeast) | 1.11 |
| ATCC 4226 | *Saccharomyces cerevisiae* 90 (yeast) | 3.33 |
| ATCC 26820 | *Paecilomyces varioti* M16 (fungus) | 3.33 |
| ATCC 26821 | *Penicillium digitatum* 0184 (mold) | 3.33 |

The compound X-4357B has also been found to be active against *Piricularia oryzae* (rice blast disease), Puccinia and Uromyces species (cereal rust disease), *Botrytis cinerea* (grey mold diseases) and *Rhizoctonia solani* (damping off diseases) on several crops.

As a larvicidal agent, the compound has exibited excellent activity against such species as the Colorado potato beetle, army worm, housefly, bean beetle and mosquito larvae among others.

As a cytotoxic agent the compound has exhibited activity in the KB (cells from the kidney of a baby hamster) monolayer test at an $ID_{50}$ of 0.0045 mcg/ml.

The following examples will serve to illustrate this invention without limiting it thereto.

EXAMPLE 1

Spores of Streptomyces X-4357 were added to shake flasks and grown in an aerated submerged culture. The pH of the broth was adjusted by the addition of KOH solution to 6.5–7.5 and the broth then sterilized. A tank fermentation (500 liters) utilizing a 5–10% inoculum consisting of 3-day old submerged growth from the aerated bottles was used. The fermentation medium contained 2% Soyalose (Type 105), 2% brown sugar, 0.5% corn steep liquor, 0.2% lard oil, 0.1% $K_2HPO_4$ and 130 ml. of antifoam SAG 4130 fed continuously into the fermentation. The fermentation was carried out at 2820 C. under positive air pressure, with air-flows of 5–10 cu. ft. of air per minute per 40 to 80 gallon liquid charge. After 90 hours fermentation, an equal volume of chloroform was added to the harvested broth. After stirring the mixture for one hour, the solvent layer was seperated and the broth extracted a second time with 500 liters of chloroform. The two chloroform extracts were pooled and concentrated to an oil under reduced pressure. This residual oil was redissolved in one liter of acetonitrile and washed twice with equal volumes of n-hexane. The acetonitrile layer was then evaporated under reduced pressure and redissolved in one liter of methylene chloride. The methylene chloride solution was washed in turn with equal volumes of 1 N HCl, 1 N NaOH, water and then dried over anhydrous $Na_2SO_4$. The dried solution was concentrated to approximately 100 ml. and added to one liter of hexane to give a precipitate of a crude co-produced actinomycin. Crystals of the crude actinomycin were subsequently shown to be a mixture of actinomycins.

The hexane filtrate was concentrated under reduced pressure to an oil which was triturated in turn with one liter of diethyl ether. The resulting solid was filtered off and recrystallized from methylene chloride-ethanol to yield the desired antibiotic X-4357B, m.p. 179°–180° $[\alpha]_D$ −11.6° (c, 1 in $CHCl_3$). Field desorption mass spectrometry suggested molecular formula is $C_{47}H_{73}NO_{15}$ (molecular weight 891). (See FIG. 1.)

Microanalysis:

calcd %C, 63.28; %H, 8.25; %N, 1.57; %O, 26.90; % methoxyl (2) 6.92 found %C, 63.18; %H, 8.71; %N, 1.53; %O, 26.97; % methoxyl, 6.98.

Nmr ($CDCl_3$):

δ 0.82 (t, $CH_3$—$CH_2$), 1.04 (d, $CH_3$—CH), 1.22 (d, $CH_3$—CH), 1.58 (d, $CH_3$—CH=), 1.83 (s, $CH_3CO$), 1.97 (s, $CH_3CO$), 3.23 (s, $OCH_3$), 3.54 (s, $OCH_3$), 5.15 (s, OH, exch.), 5.73 (s, OH, exch.), 6.39 (s, CH=), 6.55 (q, trans CH=CH—CH=).

UV max (ethanol):

245 nm (ε 40,500), 285 nm (ε 19,500).

IR ($CHCl_3$):

$\nu_{max}$ 1680 (amide), 1715 (ester), 3430 (NH), 3540, 3630 and 3680 (OH) cm$^{-1}$.

For preparation of the fungicidal and larvicidal compositions of the present invention, the antibiotic X-4357B is diluted with a carrier and if necesary, incorporated with other auxiliary agents, whereby the said substances can be formulated into any of dusts, granules, fine granules, wettable powders, emulsifiable concentrates, oil sprays, etc. It is needless to say that the purification may be discontinued at an optimal stage of purification and the resulting crude substance, which has not completely been purified, may be used as the active ingredient. In case such crude substance is desired to be used, it is sufficient that the pure substance is present in such crude substance in a concentration to attain the activity desired.

The carrier referred to herein means a synthetic or natural inorganic or organic substance which is added to an insecticide in order to make the active ingredient thereof easy to reach the objectives such as plants, mites, harmful insects, etc., or to facilitate the storage, transportation or handling of the active ingredient.

Examples of suitable solid carriers include inorganic substances such as clay, talc, diatomaceous earth, keolin, bentonite, calcium carbonate and synthetic calcium silicate; natural and synthetic resins such as coumarone, resins, alkyd resins and polyvinyl chloride; waxes such as carnauba wax and paraffin wax; shells of nuts such as walnuts and coconuts; and soybean flour.

Examples of suitable liquid carriers include water; alcohols such as ethanol, isopropanol and ethylene glycol; glycol ethers such as ethylene glycol monophenyl ether, and diethylene glycol monoethyl ether; ketones such as acetone, ethyl isobutyl ketone, cyclohexanone, acetophenone and isophorone; ethers such as tetrahydrofuran and dioxane; aromatic hydrocarbons such as benzene, toluene, xylene and methyl naphthalene; chlorinated hydrocarbons such as trichloroethylene; and carbon tetrachloride; and low, medium and high boiling petroleum fractions containing kerosine, light oils or aromatic hydrocarbons.

Examples of suitable propellants include Furon gases, liquefied petroleum gases, methyl ether and vinyl chloride monomers.

For emulsifying, dispersing, wetting or spreading, there is used a surface active agent, which may be ionic or nonionic. Examples of suitable anionic surface active agents include sodium and calcium salts of lignosulfonic acid, sodium and potassium salts of oleic acid, sodium salt of laurylsulfonic acid, and sodium and calcium salts of dodecylbenzenesulfonic acid. Examples of suitable cationic surface active agents include higher aliphatic amines and ethylene oxide condensates of higher aliphatic amines. Examples of suitable nonionic surface active agents include glycerides of fatty acids, sucrose esters of fatty acids, ethylene oxide condensates of higher aliphatic alcohols, ethylene oxide condensates of higher fatty acids, ethylene oxide condensates of alkyl phenols and alkyl naphthols, and copolymers of ethylene oxide with propylene oxide.

The insecticidal and acaricidal composition of the present invention may contain a protective colloid agent such as gelatin, gum arabic, casein, polyvinyl alcohol or carboxymethyl cellulose, or a thixotropy agent such as sodium polyphosphate or bentonite. The composition of the present invention may further contain other compounds having insecticidal and acaricidal activities such as, for example, 2-(1-methylpropyl)-4,6-dinitrophenyl-$\beta$, $\beta$-dimethyl acrylate, di-(p-chlorophenyl)-cyclopropylcarbinol, N'-(2-methyl-4-chlorophenyl)-N,N-dimethylformamidine, 2,4,4',5-tetrachlorodiphenylsulfone, 1,1-bis,-(p-chlorophenyl)-2,2,2-trichloroethanol-O,O-diethyl-S-(2-ethylthio)ethylphosphorodithioate, O,O-dimethyl-S-(N-methyl-N-formylcarbamoylmethyl)phosphorodithioate, 2-sec-butylphenyl-N-methylcarbamate or m-tolyl-N-methyl-carbamate, or a mineral oil, whereby the effects of the composition are more increased and, in some cases, synergistic effects may be expected. It is needless to say that the composition of the present invention may be used in admixture with any of fungicides, herbicides, plant growth regulators, attractants, fertilizers, etc.

The antibiotic X-4357B exhibits larvicidal activity against insects such as the bean beetle, Colorado potato beetle and mosquito. Larvicidally active amounts of the novel antibiotic range from $1 \times 10^{-5}$ to $1 \times 10^{-7}$ grams of material per cm$^2$ of surface area, the compound being tested by spraying on the leaves of the infected plant. The antibiotic X-4357B exhibits fungicidal activity agnist grey mold, rice blast, crown rust of oats and wood decay organisms. Fungicidally active amounts of the novel antibiotic range from 5 to 1600 mg/liter, the compound being tested by spraying as a 25% wettable powder on the seeds or leaves of plants at the one leaf stage.

Figure 2:
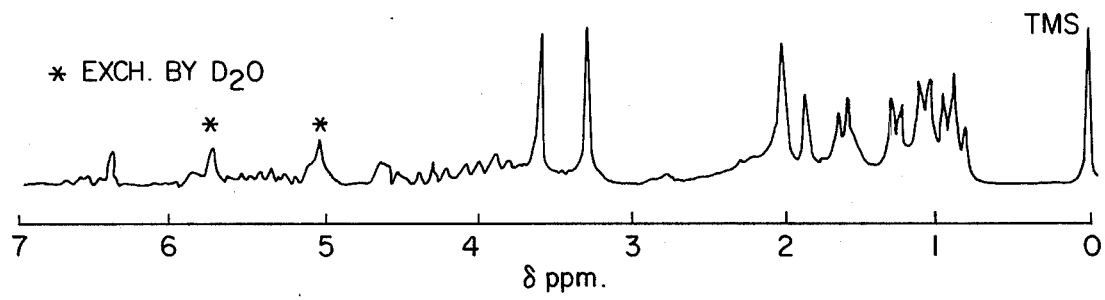
Figure 3:
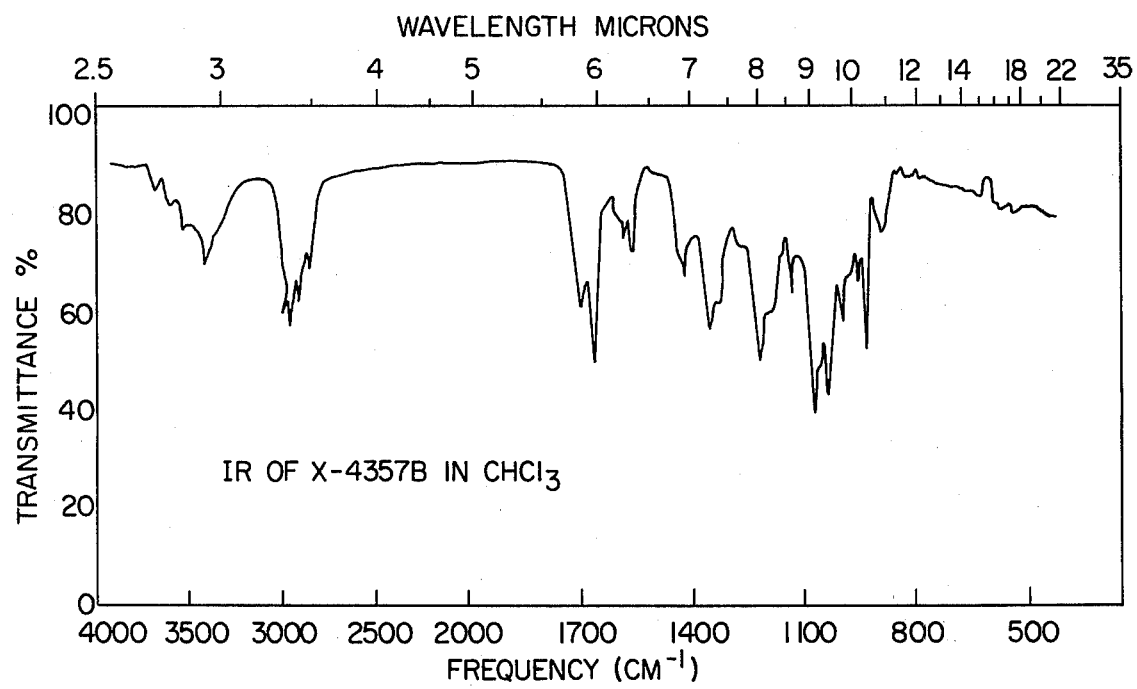

I claim:

1. Antibiotic X-4357B which has a melting point of 179–180° C., a molecular weight of 891, elementary analysis values of C 63.18%, N 1.53% and methoxyl 6.98%, the field desorption mass spectrograph illustrated in FIG. 1, the nuclear magnetic resonance curve illustrated in FIG. 2 and the infrared curve illustrated in FIG. 3 hereof.

2. A process to produce antibiotic X-4357B as described in claim 1 which comprises cultivating Streptomyces X-4357, NRRL 11082 in an aqueous nutrient medium under aerobic conditions until substantial antibiotic activity is imparted to said medium by the production of antibiotic X-4357B.

* * * * *

UNITED STATES PATENT AND TRADEMARK OFFICE
CERTIFICATE OF CORRECTION

PATENT NO. : 4,076,802
DATED : February 28, 1978
INVENTOR(S) : JOHN WESTLEY

It is certified that error appears in the above—identified patent and that said Letters Patent are hereby corrected as shown below:

Claim 1, column 6, line 44, after "C 63.18%," insert: H 8.71%,

Claim 1, column 6, line 44, after "N 1.53%" insert: , O 26.97%

Signed and Sealed this

Seventh Day of August 1979

[SEAL]

Attest:

LUTRELLE F. PARKER
*Attesting Officer*     *Acting Commissioner of Patents and Trademarks*